United States Patent [19]
Abe et al.

[11] Patent Number: 5,686,714
[45] Date of Patent: Nov. 11, 1997

[54] DUST-PROOF PORTABLE IC CARD READER

[75] Inventors: Yuhei Abe; Takashi Azumi, both of Hitachinaka, Japan

[73] Assignee: Hitachi, Ltd., Tokyo, Japan

[21] Appl. No.: 521,912

[22] Filed: Aug. 31, 1995

[30] Foreign Application Priority Data

| Sep. 7, 1994 | [JP] | Japan | 6-214010 |
| Sep. 8, 1994 | [JP] | Japan | 6-214821 |
| Sep. 9, 1994 | [JP] | Japan | 6-215585 |
| Oct. 7, 1994 | [JP] | Japan | 6-243669 |

[51] Int. Cl.⁶ ............................................. G06K 7/00
[52] U.S. Cl. ............................. 235/435; 235/441
[58] Field of Search .................................. 235/441, 435, 235/439, 444, 449; 312/229; 414/291

[56] References Cited

U.S. PATENT DOCUMENTS

| 4,277,837 | 7/1981 | Stuckert | 235/380 |
| 5,015,830 | 5/1991 | Masuzawa et al. | 235/441 |
| 5,265,951 | 11/1993 | Kumar | 312/223.2 |
| 5,286,957 | 2/1994 | Defrasne | 235/441 |
| 5,478,996 | 12/1995 | Muto et al. | 235/441 |
| 5,508,501 | 4/1996 | Fujimoto et al. | 235/441 |

FOREIGN PATENT DOCUMENTS

| 0230275 | 7/1987 | European Pat. Off. . | |
| 0307692 | 3/1989 | European Pat. Off. | 235/441 |
| 0510599 | 10/1992 | European Pat. Off. . | |
| 0576338 | 12/1993 | European Pat. Off. | 235/441 |
| 2653249 | 4/1991 | France . | |
| 4-181394 | 6/1992 | Japan . | |
| 6-176207 | 6/1994 | Japan | 235/441 |
| 6-176208 | 6/1994 | Japan | 235/441 |

*Primary Examiner*—Harold Pitts
*Assistant Examiner*—Jeffrey R. Filipek
*Attorney, Agent, or Firm*—Antonelli, Terry, Stout & Kraus, LLP

[57] ABSTRACT

A portable IC card reader for retrieving information from an IC card incorporating a semiconductor memory device and for displaying at least part of retrieved information. The portable IC card reader, which is of a size suitable to fit in a clothes pocket, a bag, or the like, includes a housing having a display portion provided on a part of the housing for displaying at least part of the retrieved information, and incorporating a controller. The housing further includes, at least at a part of the surface thereof, an IC card insert port through which the IC card is inserted and an IC card accommodating unit extending straight from the IC card insert port to an opposite side of the housing. The housing further includes a foreign-matter ejection exit formed by extending the IC card accommodating unit and opening at the opposite side of the integrated-circuit card insert port. In operation, foreign matter is ejected form the IC card accommodating unit by insertion of the IC card, thereby advantageously preventing the IC card reader from malfunctioning as a result of the foreign matter.

20 Claims, 9 Drawing Sheets

DUST-PROOF PORTABLE IC CARD READER

BACKGROUND OF THE INVENTION

1. Field of the Invention

The present invention relates to an IC (Integrated Circuit) card reader for reading and displaying the contents of an IC card, and more particularly to a portable IC card reader which can be carried in a clothes pocket, a bag, or the like.

2. Description of the Related Art

U.S. Pat. No. 5,265,951 discloses an electronic terminal device (an IC card reader) of a conventional type for retrieving information from an IC card. More specifically, the electronic terminal device reader is used as an information storage medium which displays information retrieved from the IC card inserted into an electromagnetically shielded input port. In the disclosed technique, the IC card insert port, through which an IC card is inserted, is arranged with a dust-proof lid. The lid is opened only when an IC card is inserted and kept closed when no IC card is inserted. This setup prevents the IC card reader from malfunctioning or experiencing undue deterioration due to foreign matter such as dust entering through the card insert port.

In the above-mentioned conventional construction, the lid provided at the IC card insert port makes it difficult for foreign matter to penetrate the IC card reader. However, it is still possible for very minute foreign manner to penetrate the IC card reader, little-by-little through a gap located at the IC card insert port, or the like. In normal use, the minute foreign matter that enters the IC card reader accumulates there. The accumulated foreign matter contaminates electrical contacts of an inserted IC card to adversely affect its inner electronic circuit as well as the electronic circuit of the IC card reader.

If the conventional IC card reader is carried in a clothes pocket or a bag, foreign matter that may penetrate the IC card reader may include not only dust and grit that can cause electrical damage relatively seldomly, but also metal clips or the like that may short-circuit the IC card reader as well as adhesive materials that may stick to the inner wall of the IC card reader to cause some form of mechanical trouble. For example, if foreign matter sticks to any of the contact electrodes that get information from the inserted and electrically contacted IC card, poor contact may occur between the contaminated contact electrode and a corresponding mating contact, thereby making it impossible to get information from the IC card or getting wrong information.

In a particularly troublesome case, if wrong information is retrieved from an IC card when displaying the bank deposit balance or the ID number for example, a serious problem may be encountered for the user of the IC card. Therefore, popularization of the use of IC cards requires the IC card reader to be constructed such that it is difficult for foreign matter to penetrate to reduce chances of foreign-matter induced, erroneous operations, thereby significantly enhancing the reliability of the IC card reader.

Conventional IC card readers have no measure to protect against dust, and particularly offer no construction to protect against foreign matter penetration, especially when the IC card reader is carried inside a clothes pocket or a bag.

SUMMARY OF THE INVENTION

It is therefore an object of the present invention to provide a portable, highly reliable IC card reader having a dust-proof construction that prevents penetration of foreign matter, especially when the IC card reader is carried in a clothes pocket, a bag, or the like.

2

It is another object of the present invention to provide a highly reliable IC card reader constituted to automatically eject foreign matter from inside an IC card accommodating unit in the IC card reader by the action of inserting an IC card.

It is still another object of the present invention to provide a highly reliable IC card reader constructed to automatically clean an IC card accommodating unit by the action of inserting the IC card.

In carrying out the invention according to one aspect thereof, there is provided a portable IC card reader for retrieving information from an IC card incorporating a semiconductor memory device, and for displaying at least part of the retrieved information, with the portable IC card reader being adapted to be portable in a clothes pocket, a bag, or the like. The IC card reader includes a housing having a display portion provided on a part of the housing for displaying at least part of retrieved information, a controller within the housing, and IC card port on at least at a part of the surface of the housing through which the IC card is inserted, and an IC card accommodating unit extending straight from the IC card insert port to the opposite side thereof. The housing further includes a foreign-matter ejection opening formed by extending the IC card accommodating unit and opening at the opposite side of the IC card insert port.

In carrying out the invention according to another aspect thereof, there is provided a portable IC card reader for retrieving information from an IC card incorporating a semiconductor memory device and displaying at least part of retrieved information, the portable IC card reader being portable in a clothes pocket, a bag or the like, comprising: a housing having a display portion provided on a part of the housing for displaying the at least part of retrieved information and incorporating a controller, the housing further having, at least at a part of the surface thereof, an IC card insert port through which the IC card is inserted and an IC card accommodating unit extending straight from the IC card insert port to the opposite side thereof, the housing still further having a foreign-matter ejection member for ejecting foreign matters from the IC card accommodating unit by insertion of the IC card.

In carrying out the invention and according to still another aspect thereof, there is provided a portable IC card reader for retrieving information from an IC card incorporating a semiconductor memory device and displaying at least part of retrieved information, the portable IC card reader being portable in a clothes pocket, a bag or the like, comprising: a housing having a display portion provided on a part of the housing for displaying the at least part of retrieved information and incorporating a controller, the housing further having, at least at a part of the surface thereof, an IC card insert port through which the IC card is inserted and an IC card accommodating unit extending straight from the IC card insert port to the opposite side thereof, the housing still further having a cleaning member for cleaning the inside of the IC card accommodating unit by insertion of the IC card.

In carrying out the invention and according to yet another aspect thereof, there is provided a portable IC card reader for displaying data stored in an IC card, comprising: a space in which an IC card is loaded, the space having a first opening through which the IC card is inserted and a second opening connecting to the first opening.

In carrying out the invention and according to a separate aspect thereof, there is provided a portable IC card reader for displaying data stored in an IC card, comprising: a space in which the IC card is loaded, the space having a first opening through which the IC card is inserted and a second opening connecting to the first opening, the first opening having a lid member slidable inside, the lid member being slid inside by insertion of the IC card to clean the inside of the space, the lid member being moved up to a proximity of the second opening.

According to the portable IC card reader provided by the present invention, foreign matters that penetrated in the IC card accommodating unit during carrying of the IC card in a clothes pocket, a bag or the like are collected and ejected outside the IC card accommodating unit by insertion of the IC card or the inside of the IC card accommodating unit is cleaned. This novel setup ensures good contact between the contact electrodes of the IC card and the contact electrodes of the IC card accommodating unit, thereby realizing the easy-to-carry, highly reliable IC card reader.

The above and other objects, features and advantages of the present invention will become more apparent from the accompanying drawings, in which like reference numerals are used to identify the same or similar parts in several views.

DESCRIPTION OF THE PREFERRED EMBODIMENTS

This invention will be described in further detail by way of example with reference to the accompanying drawings.

Figure 1:
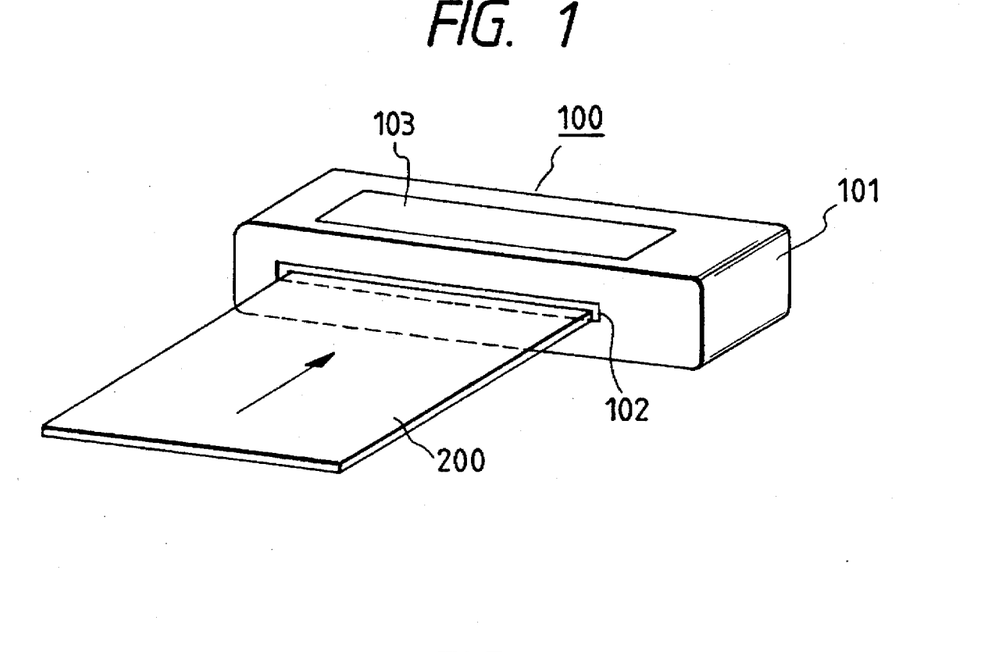
FIG. 1 is a perspective diagram illustrating a first preferred embodiment of a portable IC card reader according to the invention, the IC card reader being in use.

Now, referring to FIG. 1, there is shown a perspective view of a first preferred embodiment of a portable IC card reader 100 of the invention. Reference numeral 101 indicates an IC card reader housing molded from plastic, for example. Reference numeral 102 indicates an IC card insert port formed along one of the longitudinal sides of the housing. FIG. 1 shows a state in which an IC card 200 incorporating a semiconductor memory is inserted in the IC card insert port 102, the semiconductor memory being capable of holding information without backup power. The IC card will be described in detail later. It should be noted that an IC card accommodating unit 104 (FIG. 2) to be described later extends from the insert port 102 through the housing 101 to the opposite end. Reference numeral 103 indicates an IC card reader display device which is preferably formed with a liquid crystal display (LCD). In addition, the IC card reader 100 incorporates a controller (FIG. 5) including a microcomputer and other devices in the form of a control IC.

Figure 2:
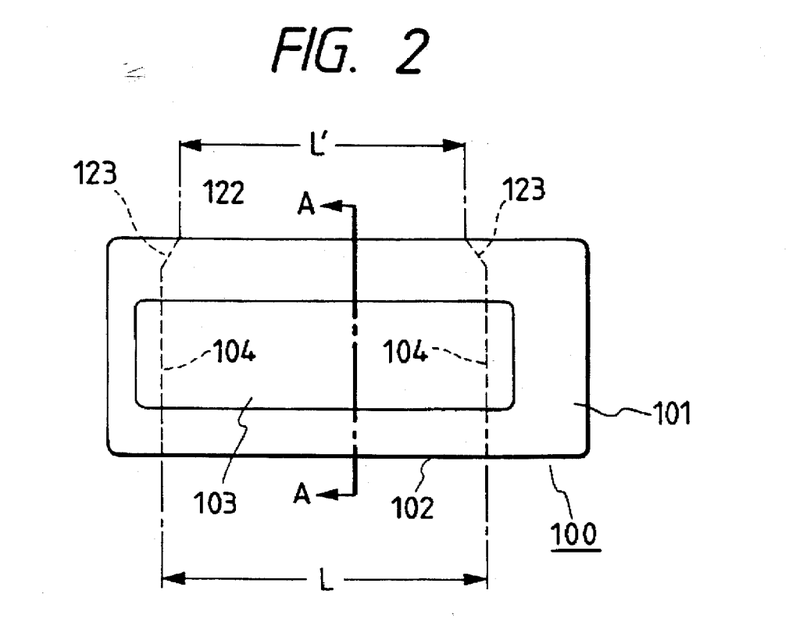
FIG. 2 is a top view of the portable IC card reader of FIG. 1.

Referring to FIG. 2, there is shown a top view of the IC card reader 100, especially showing the relationship between the external view of the IC card reader 100 and the IC card accommodating unit 104. Namely, in the figure, the inner walls of the IC card accommodating unit 104 are indicated by dashed lines and the width of the IC card insert port 102 is indicated by L. The inner walls of the IC card accommodating unit 104 extend to the opposite side of the IC card insert port 102 to open at that side as a second opening 122 (or foreign-matter ejection exit). The IC card accommodating unit 104 is formed with abutting portions 123 at the respective inner walls. The abutting portions 123 are arranged to change the width of the IC card accommodating unit 104 at the second opening 122. To be specific, the inner walls project toward the center of the IC card accommodating unit 104 until a second width L' is formed. The relationship between L and L' is L>L'.

Figure 3:
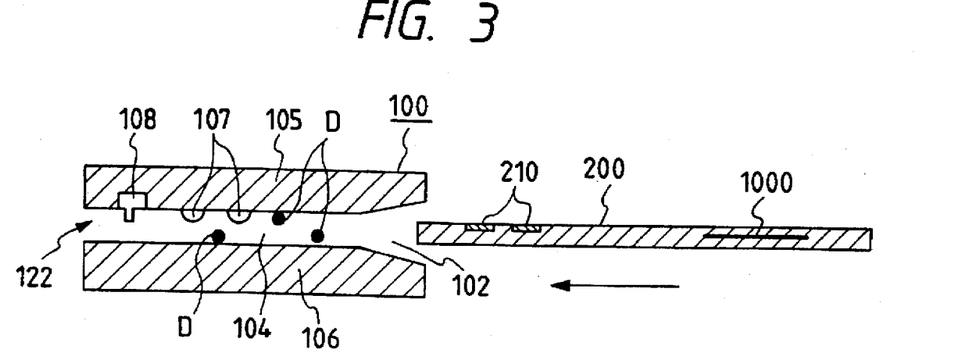
FIG. 3 is a cross sectional view of the IC card reader of FIG. 2 along a dot-and-dash line A—A.

Referring to FIG. 3, there is shown a cross section of the IC card reader 100 along A—A of FIG. 2 with no IC card inserted. In FIG. 3, reference numeral 105 indicates an upper member of the IC card reader housing 101 while reference numeral 106 indicates a lower member thereof. Reference numeral 107 indicates a plurality of contact electrodes 107 mounted inside the IC card accommodating unit 104 of the IC card reader 100. To be specific, the plurality of contact electrodes 107 are mounted on the upper member 105 at the underside thereof. As seen from FIG. 4, the plurality of contact electrodes 107 are arranged such that they come contact with a plurality of contact electrodes 210 provided on one side of an IC card 200 inserted in the IC card accommodating unit 104 of the IC card reader 100. Reference numeral 108 indicates an edge sensing switch for sensing the leading edge of the inserted IC card 200. Like the contact electrodes 107, the sensing switch 108 is also mounted on the upper ember 105 at the underside thereof at the end opposite to the IC card insert port 102. The sensing switch 108 may also serve as a block for preventing the IC card 200 from being inserted from the foreign-matter ejection exit 122 provided at the opposite side of the IC card insert port 102.

The IC card accommodating unit 104 formed from the insert port 102 of the housing 101 toward the inside thereof tapers until the height of the accommodating unit 104 gets slightly larger than the thickness of the IC card 200 and then runs toward the opposite side, maintaining the same height. It will be apparent that such a construction of the IC card accommodating unit 104 facilitates the insertion of the IC card 200 from the insert port 102. The tapering may be curved out. FIG. 3 also shows foreign matters D attached to the inner walls of the IC card accommodating unit 104.

Figure 4:
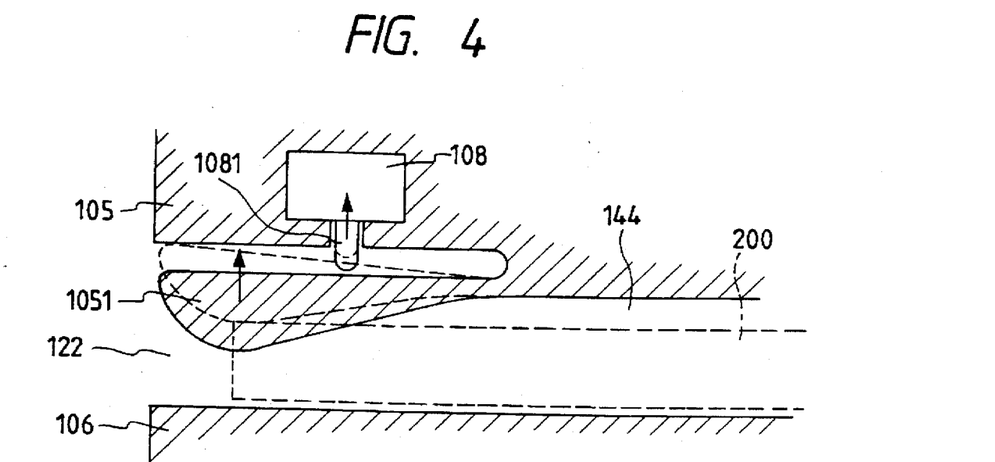
FIG. 4 is an enlarged cross sectional view of an edge sensing switch of the portable IC card reader of FIG. 1.

Referring to FIG. 4, there is shown a construction of the edge sensing switch 108 for sensing the leading edge of the inserted IC card 200. As apparent from FIG. 4, the upper member 105 of the housing 101 is partially formed into a movable reed-like portion 1051 which gets thicker toward the free end thereof, the cross section being generally triangular. Hence, when the IC card 200 is inserted, the reed-like movable portion 1051 is pressed up as indicated with dashed lines to push a movable bar of the edge sensing switch 108, thereby closing a switch incorporated in the edge sensing switch 108. Thus, the edge sensing switch 108 senses that the IC card 200 has been set in place in the IC card accommodating unit 104.

Figure 5:
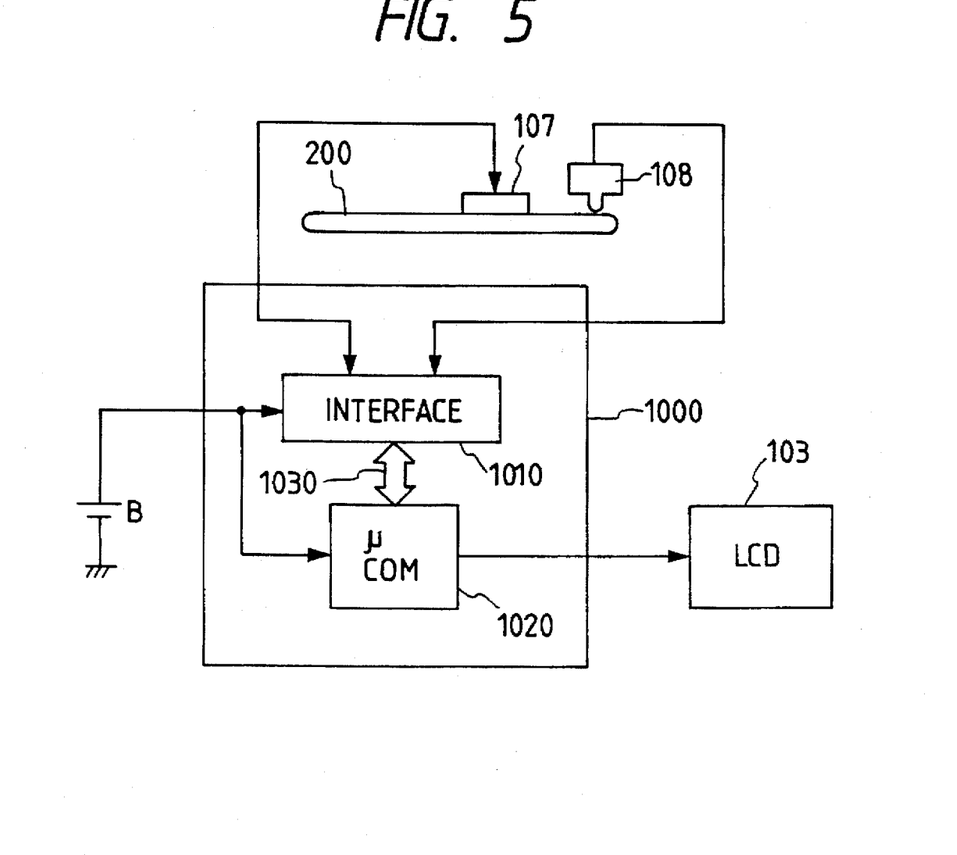
FIG. 5 is a block diagram illustrating a circuit constitution of a control IC and associated portions incorporated in the portable IC card reader of FIG. 1.

Referring to FIG. 5, there is shown a block diagram illustrating a control IC 1000 constituting a controller accommodated in the housing 101 of the IC card reader 100, and peripheral circuits of the control IC 1000. The control IC 1000 includes an interface circuit 1010 and a microcomputer 1020 incorporating a memory. A bus line 1030 connects the interface circuit 1010 and the microcomputer 1020. The microcomputer 1020 sends its output to the liquid crystal display (LCD) that constitutes the IC card reader display device 103. The interface circuit 1010 is connected with the plurality of contact electrodes 107 that come in electrical contact with the plurality of contact electrodes 210 provided on the IC card 200. In addition, the interface circuit 1010 is connected with the edge sensing switch 108 of which detail construction is shown in FIG. 4. Reference symbol B in FIG. 5 indicates a battery from which a power voltage is applied to the microcomputer 1020 and, via the interface circuit 1010, to the IC card 200. It should be noted that the interface circuit 1010 may have a voltage converter, in the case of which the necessity of voltage conversion may be determined by the microcomputer 1020. The IC card 200 may also incorporate a power supply such as a battery (a button-shaped battery) or a solar battery, in the case which a memory of a type that retains information by the backup power may be used for an electronic memory device to be incorporated in the IC card.

Figure 6:
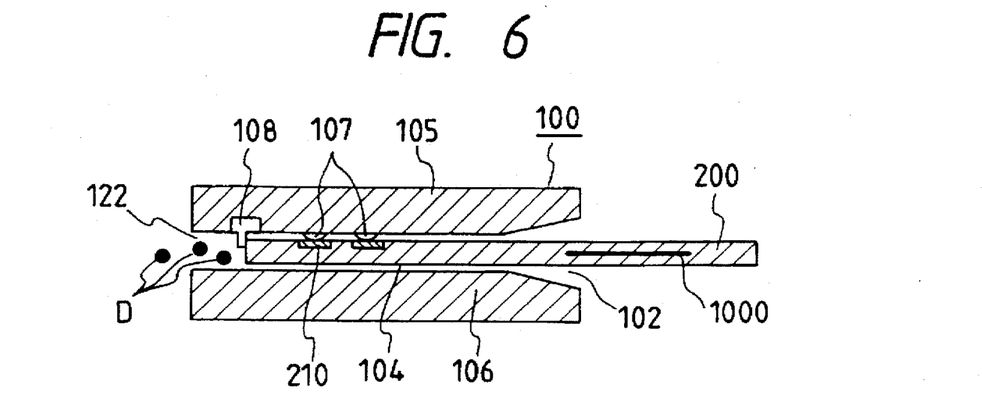
FIG. 6 is a cross sectional view illustrating a foreign-matter ejecting action in the portable IC card reader of FIG. 1.

The following describes operations of the above-mentioned IC card reader 100 with reference to FIG. 6 in addition to the above-mentioned figures. First, in FIGS. 1 and 3, when the IC card 200 is inserted in the IC card insert port 102 in the direction of the arrow until stopped by the abutting portions 123 (tapering inner walls) of the foreign-matter ejection exit 122 having the width L', the IC card 200 is fixed in place in the IC card accommodating unit 104. In this state, as shown in FIG. 6, the plurality of contact electrodes 210 provided on one side of the IC card 200 are in contact with the plurality of contact electrodes 107 provided inside the IC card accommodating unit 104. At the same time, the leading edge of the IC card 200 presses up the reed-like movable portion 1051 in the direction of the arrow as shown in FIG. 4, thereby activating (closing) the edge sensing switch 108. Thus, it is detected that the IC card 200 has been inserted up to the predetermined position in the IC card reader 100. To be specific, as shown in FIG. 5, a sensing output of the edge sensing switch 108 is put in the microcomputer 1020 via the interface circuit 1010, thereby starting the operation of the IC card reader 100. For example, the IC card reader 100 supplies a predetermined power to the IC memory in the inserted IC card 200, reads information from the IC memory in the IC card 200 or writes information to the IC memory as required, and displays the information on the display device 103 mounted on the IC card reader 100. The information stored in the IC memory in the IC card 200 or displayed on the display device 103 includes an ID number and a balance of deposit for example.

It should be noted that the foreign matters D attached to the inside of the IC card accommodating unit 104 are pushed by the leading edge of the inserted IC card 200 out of the foreign-matter ejection exit 122 provided at the opposite side of the IC card insert port 102 as shown in FIG. 6. Namely, according to the construction of the IC card reader 100 of the present invention, in particular, the construction of the IC card accommodating unit of the present invention, the IC card 200 is inserted in the IC card accommodating unit 104 of the IC card reader 100 to read and display information from the IC card 100 for checking the contents of the IC card 200 and, at the same time, remove the foreign matters out of the IC card accommodating unit 104, the foreign matters imposing a risk of causing the IC card reader 100 and/or the IC card 200 to malfunction. Therefore, the foreign matters that has penetrated the IC card accommodating unit 104 while the IC card reader 100 was carried out in a clothes pocket, a bag or the like are automatically cleaned for reliable checking of the storage contents of the IC card 200. As described, the construction of the IC card reader practiced as the above-mentioned embodiment is very simple and therefore finds suitable application especially in a low-cost IC card readers.

Figure 7:
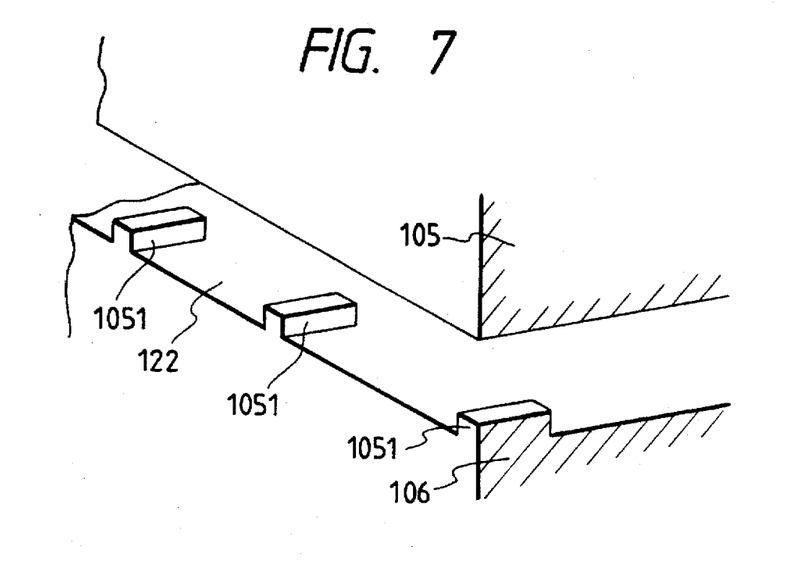
FIG. 7 is a partially enlarged perspective view illustrating a variation of a construction of an IC card accommodating unit of the portable IC card reader of FIG. 1.

Referring to FIG. 2, the IC card accommodating unit 104 has the abutting portions 123 that prevents the IC card 200 from advancing any further when fully inserted because the abutting portions 123 narrow the IC card accommodating unit 104 by the width L'. In the above-mentioned embodiment, the IC card accommodating unit 104 tapers toward the second opening 122. It will be apparent that the IC card accommodating unit 104 may also get narrow rather abruptly than in tapering manner to prevent the IC card 200 from advancing further. Alternatively, to attain the same effect, a plurality of generally prism-shaped blocks 1051 may be arranged on the lower member 105 constituting the IC card accommodating unit 104 in the housing 101 at the opposite end of the IC card insert port as shown in FIG. 7.

Figure 8:
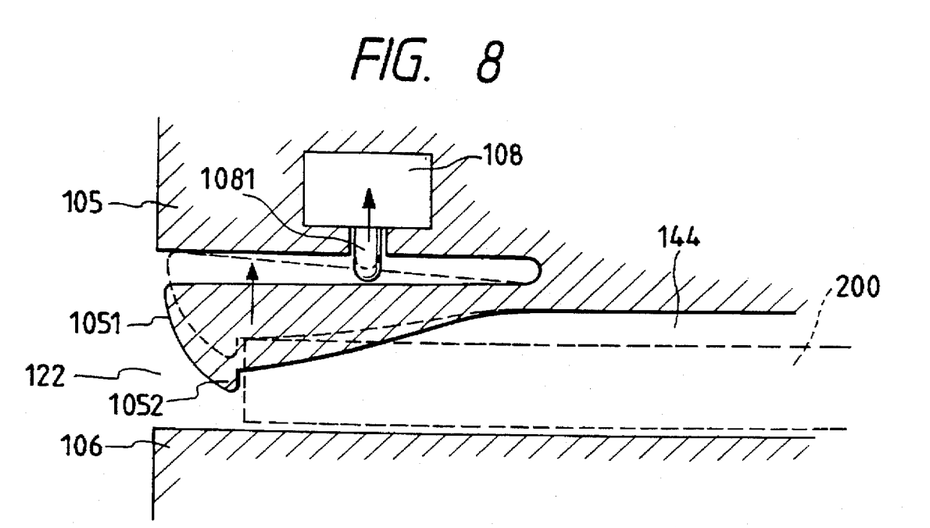
FIG. 8 is a cross sectional view of a variation of the constitution of the edge sensing switch of FIG. 4.

Further, the above-mentioned embodiment may be constituted such that the width L of the IC card accommodating unit 104 is kept unchanged by using the constitution of activating the edge sensing switch 108 shown in FIG. 4. Namely, the reed-like movable portion 1051 on the upper member 105 of the housing 101 may be formed with a downward step 1052 as shown in FIG. 8 to define the stop position of the inserted IC card 200. Still further, as apparent from FIG. 8, the tilt angle of the reed-like movable portion 1051 may be made relatively large at the side of the foreign-matter ejection exit 122 and formed with the above-mentioned downward step 1052, to prevent the IC card 200 from being erroneously inserted from the foreign-matter ejection exit 122.

Figure 9:
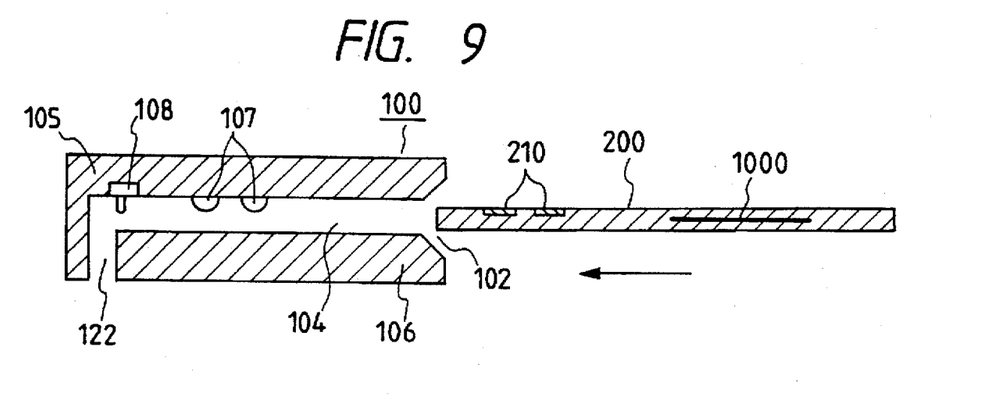
FIG. 9 is a cross sectional view illustrating a variation of a foreign-matter ejecting exit of the portable IC card reader of FIG. 3.

Referring to FIG. 9, there is shown another variation to the above-mentioned embodiment. Namely, as apparent from FIG. 9, the second port 122 serving as the foreign-matter ejection exit extends downward at the opposite end of the IC card insert port 102. As a result, the foreign matters attached in the IC card accommodating unit 104 are collected near the second opening 122 by the leading edge of the IC card 200 to be dropped out down outside the housing 101.

Figure 10:
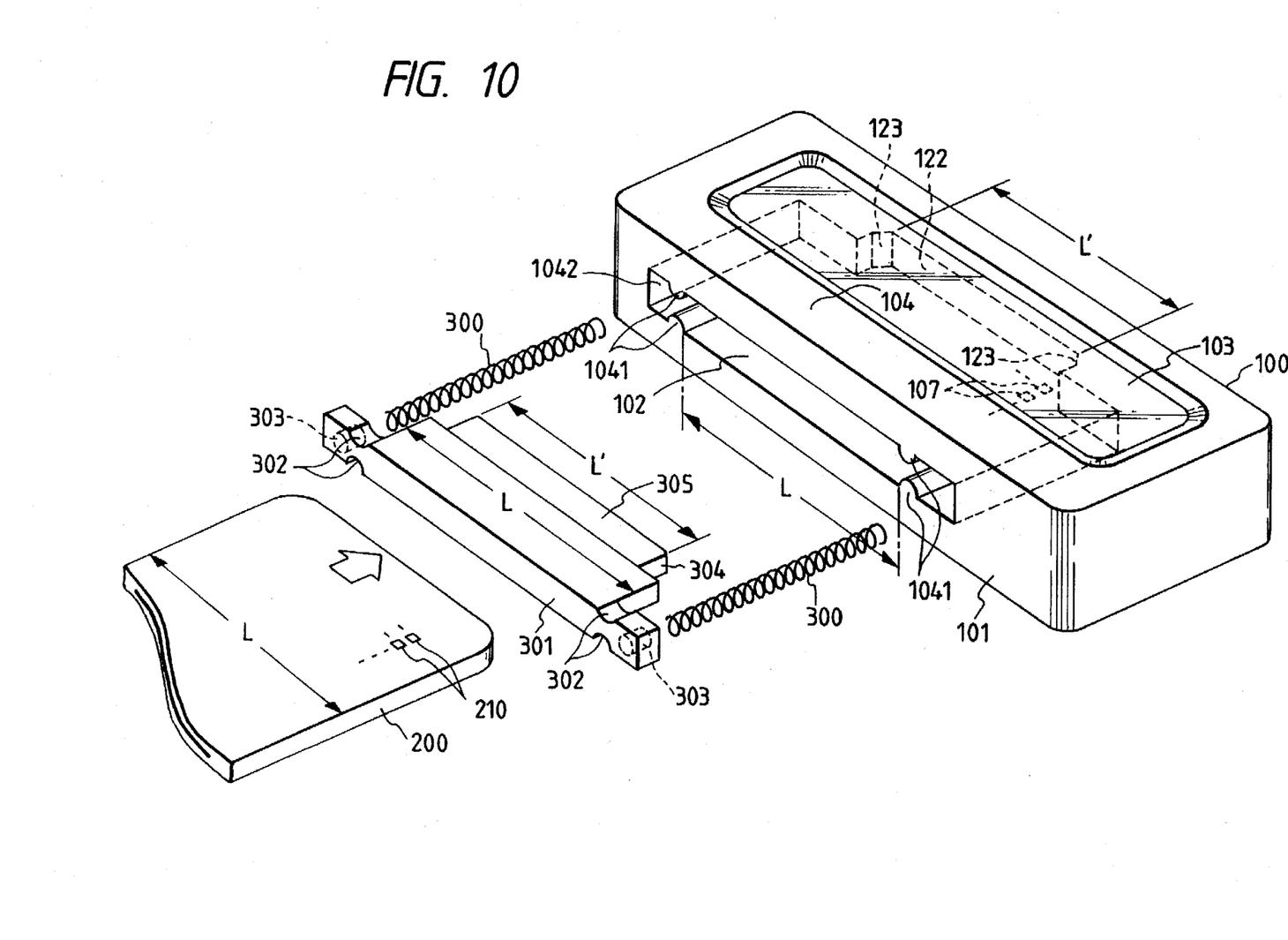
FIG. 10 is an exploded perspective diagram illustrating a second preferred embodiment of a portable IC card reader according to the present invention.
Figure 11:
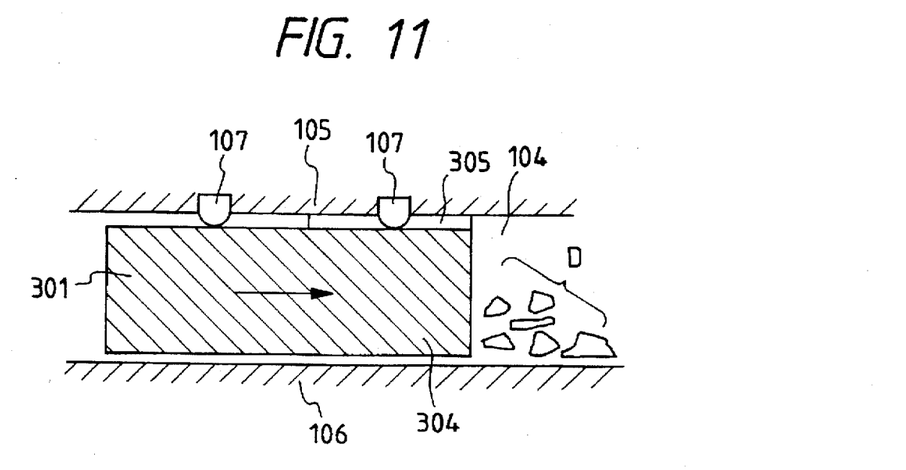
FIG. 11 is a partially enlarged cross sectional view illustrating a cleaning action of the portable IC card reader of FIG. 10.
Figure 12:
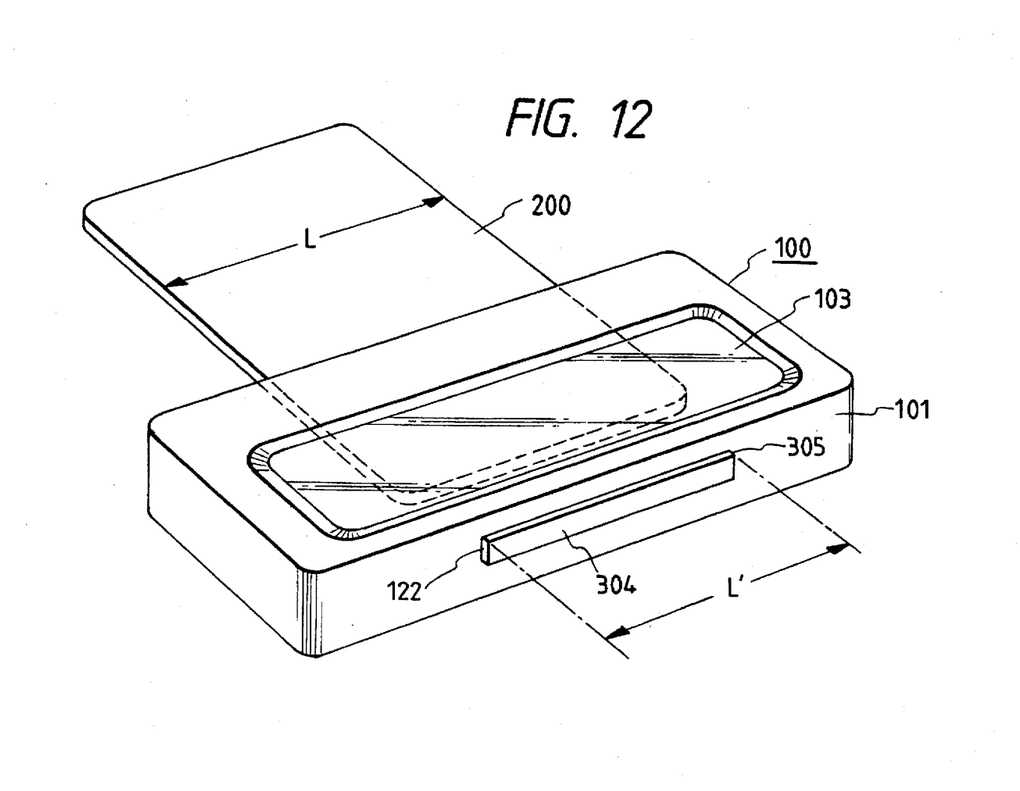
FIG. 12 is a perspective view illustrating the portable IC card reader of FIG. 10 with an IC card inserted.

Referring to FIGS. 10 through 12, there is shown a portable IC card reader practiced as a second preferred embodiment of the invention. With reference to FIGS. 10 through 12, components similar to those previously described with FIGS. 1 through 9 are denoted by the same reference numerals. In the second embodiment, a second opening serving as a foreign-matter ejection exit generally similar to the above-mentioned second opening is provided and a member for preventing penetration of foreign matters is arranged at an IC card insert port 102 of an IC card reader 100.

As apparent from FIG. 10, in the second embodiment, an IC card accommodating unit 104 extending from the IC card insert port 102, which is formed along the width of a plastic housing 101, to the opposite side of the IC card insert port 102 through the housing 101, has pairs of projections 1041 on both sides, one of the projections 1041 having generally a "U" shape, the other having generally an upside-down "U" shape. The pairs of projections 1041 form accommodating recesses 1042 in each of which a coil spring 300 is inserted. A first lid member 301 is provided to prevent foreign matters from penetrating the IC card accommodating unit 104 from the IC card insert port 102. The first lid member 301 is inserted in the IC card insert port 102 and the accommodating recesses 1042 on both sides thereof to be slid back and forth in the IC card accommodating unit 104. The lid member 301 is generally the same, in cross section, with the IC card insert port 102 including the accommodating recesses 1042 on both ends thereof (namely, the lid member 301 has generally "U"-shaped notches 302 so as to be fit in tie IC card insert port 102 and the accommodating recesses 1042). In addition, the lid member 301 is formed, at both ends thereof, with dents 303 each for receiving one of the coil spring 300. Further, the lid member 301 is formed a center projection 304 at the center thereof and on the side of a foreign-matter ejection exit 122. The center projection 304 has a cleaning member 305 attached to on the top surface thereof, the cleaning member 305 being made of felt, cloth or the like. For the cleaning member 305, flexible materials such as paper and bonded fabric for example may also be used. When assembling the IC card reader 100, the coil springs 300 are inserted in the accommodating recesses 1042, the first lid member 301 is inserted in the IC card accommodating unit 104 formed in the housing 101, and the first lid member 301 is prevented from getting out of the housing by means of a member not shown.

In the IC card reader 100 practiced as the second preferred embodiment of the invention, when the IC card 200 is inserted at the IC lid insert port 102, the first lid member 301 is pressed back against the bounce of the coil springs 300. The first lid member 301 is stopped when the IC card 200 is inserted in place. The first lid member 301 is stopped by a mechanism generally similar to that of the first embodiment. Namely, the first lid member 301 having the width L is abutted at both shoulders thereof against abutting portions 123 provided on both ends of the foreign-matter ejection exit 122, the abutting portions 123 defining the width L' of the foreign-matter ejection exit 122. It should be noted that, during the insertion, the projections 1041 in which the notches 302 of the first lid member 301 are mating serve as a guide rail.

Referring to FIG. 11, when the first lid member 310 is pressed back in the IC card accommodating unit 104, the leading edge of the first lid member 310 pushes foreign matters D out of the housing 101 and, at the same time, the cleaning member 305 made of felt for example attached on the upper surface of the first lid member 301 cleans the under surface of the upper member 105 of the housing 101. This setup sufficiently removes the foreign matters including generally adhesive foreign matters and microscopic foreign matters from the inner walls of the IC card accommodating unit 104. Especially, this cleaning setup cleans the contact surface of the contact electrodes 107 mounted on the under surface of the upper member 105 of the housing 101 to ensure good electrical contact with the contact electrodes 210 of the IC card 200. Referring to FIG. 12, the center projection 304 of the first lid member 301 pushing the foreign matters D out projects slightly from the foreign-matter ejection exit 122 provided on the opposite side of the IC card insert port 102, thereby fully ejecting the foreign matters out of the IC card accommodating unit 104.

Figure 13:
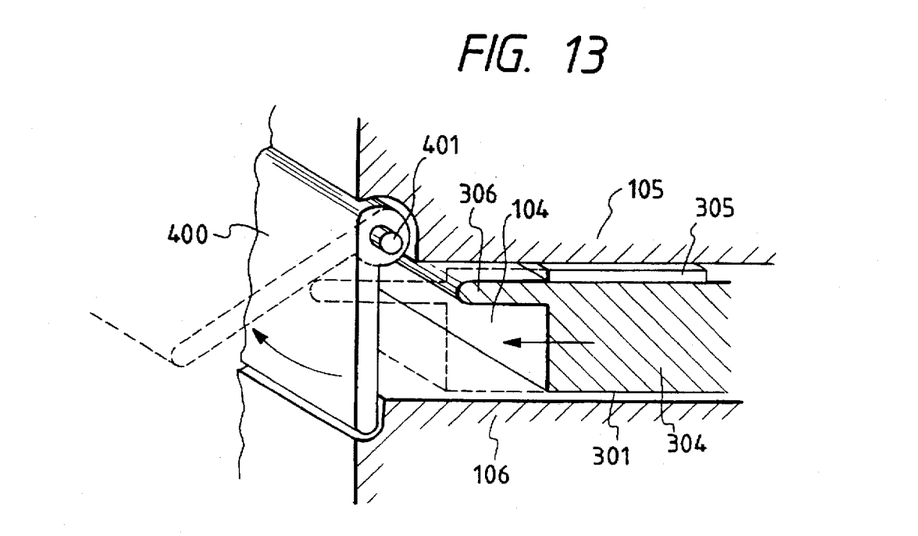
FIG. 13 is a partially enlarged perspective view illustrating a variation of the portable IC card reader of FIG. 10.

Referring to FIG. 13, there is shown a variation to the IC card reader 100 practiced as the second preferred embodiment. In this variation, a second lid member 400 is provided at the foreign-matter ejection exit 122 of the IC card reader 100 to prevent the penetration of foreign matters into the IC card accommodating unit 104 from the foreign-matter ejection exit 122. The second lid member 400 is formed with a plastic plate for example and has axial projections 401 on both sides to be mated in openings, not shown, in opposite walls constituting the foreign-matter ejection exits 122, thereby allowing the second lid member 400 to be attached to the upper member 105 in a swinging manner. It will be apparent that the second lid member 400 is constituted so as to normally close the foreign-matter ejection exit 122 by means of an elastic body such as a spring.

As apparent from FIG. 13, the first lid member 301 that slides in the IC card accommodating unit 104 has a projection 306 at the leading edge thereof for opening the second lid member 400 when the first lid member 301, or the IC card 200 has been inserted to a predetermined position. Thus, according to the variation of FIG. 13, the second lid member 400 prevents foreign matters from penetrating the IC card accommodating unit 104 from the foreign-matter ejection exit 122 of the IC card reader 100 and, at the same time, is pushed open when the IC card 200 has been inserted in place to eject the foreign matters out of the IC card accommodating unit 104.

Figure 14:
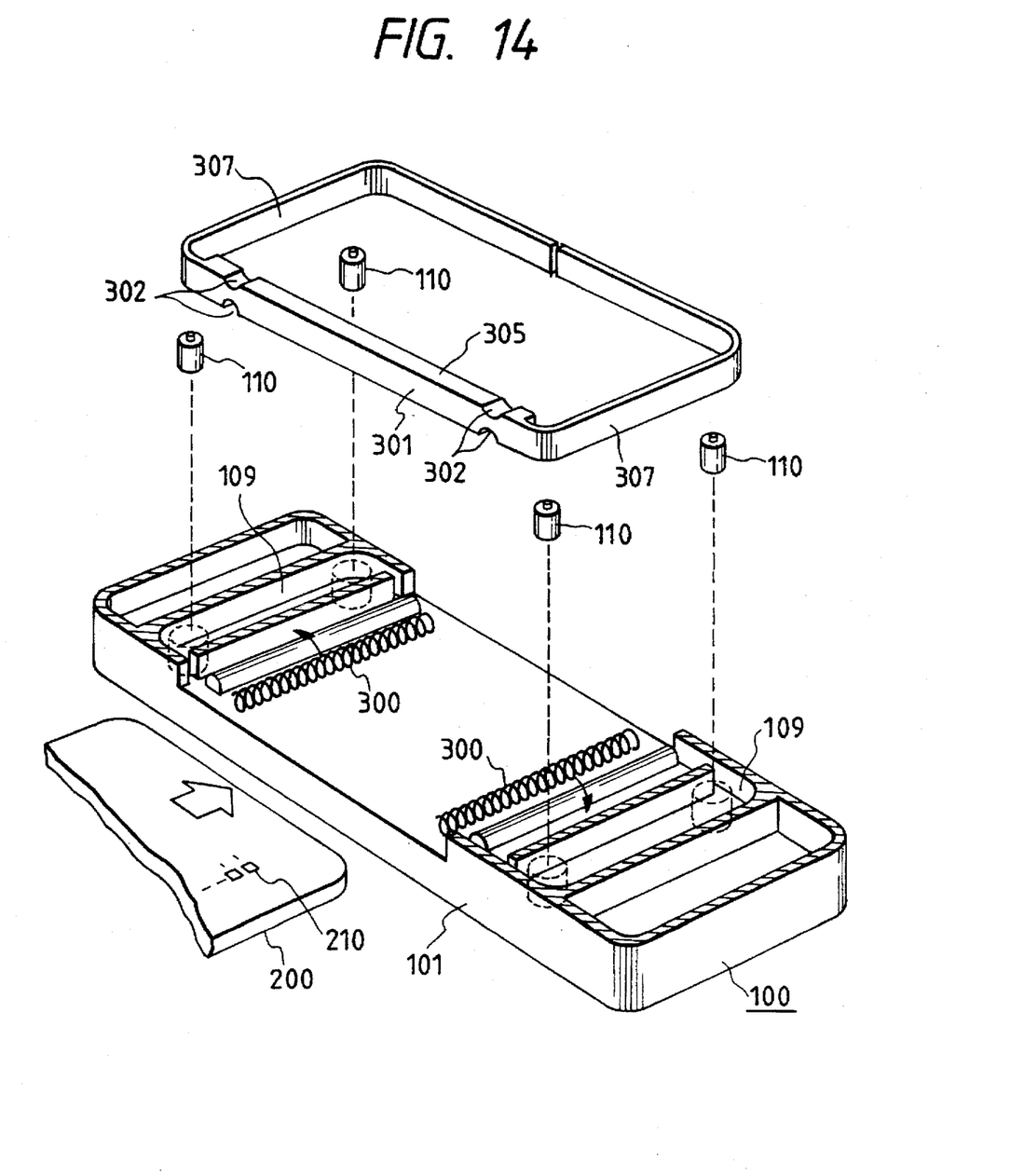
FIG. 14 is an exploded perspective view illustrating a detail constitution of a third preferred embodiment of a portable IC card reader according to the present invention.

Referring to FIG. 14, there is an IC card reader practiced as a third preferred embodiment of the invention. In this embodiment, a shield member that opens and closes while sliding is provided at the foreign-matter ejection exit 122 of the IC card reader 100. In this IC card reader 100, the first lid member 301 is attached with shield members 307 on both sides, each of the shield members 307 being formed by a thin elastic material such as vinyl chloride that returns to its original shape without leaving trace of bending. The housing 101 of the IC card reader 100 is internally formed with guide grooves 109 for slidably guiding the shield members 307. As apparent from FIG. 14, the guide grooves 109 are curved at corners thereof. Reference numerals 110 indicate guide rollers provided in the above-mentioned corners to guide the shield members 307 between the guide grooves 109 and the guide rollers 110 in a curved manner.

Figure 15:
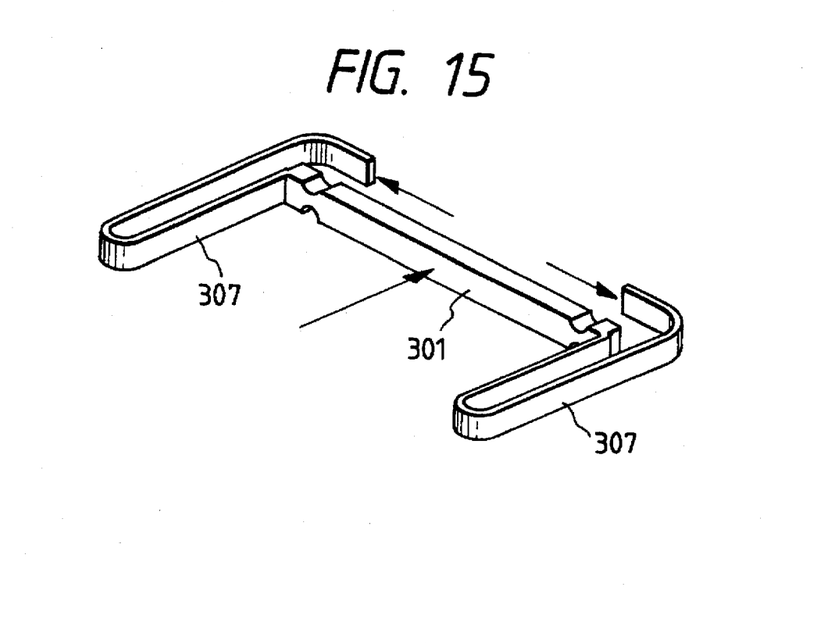
FIG. 15 is a perspective view illustrating a constitution of a shield member of the portable IC card reader of FIG. 14.

Referring to FIG. 15, in the third embodiment, when the IC card 200 is inserted at the IC card insert port 102 of the IC card reader 100, the first lid member 301 is pressed back (in the direction of long arrow) to pull the shield members 307 to both sides (in the directions of short arrows), thereby opening a second opening 122 for ejecting foreign matters. When the IC card 200 is taken from the IC card accommodating unit 104 at the IC card insert port 102, the first lid member 301 is returned to its home position by the force of springs 300 (FIG. 14) to push the shield members 307, closing the foreign-matter ejection exit 122.

Figure 16:
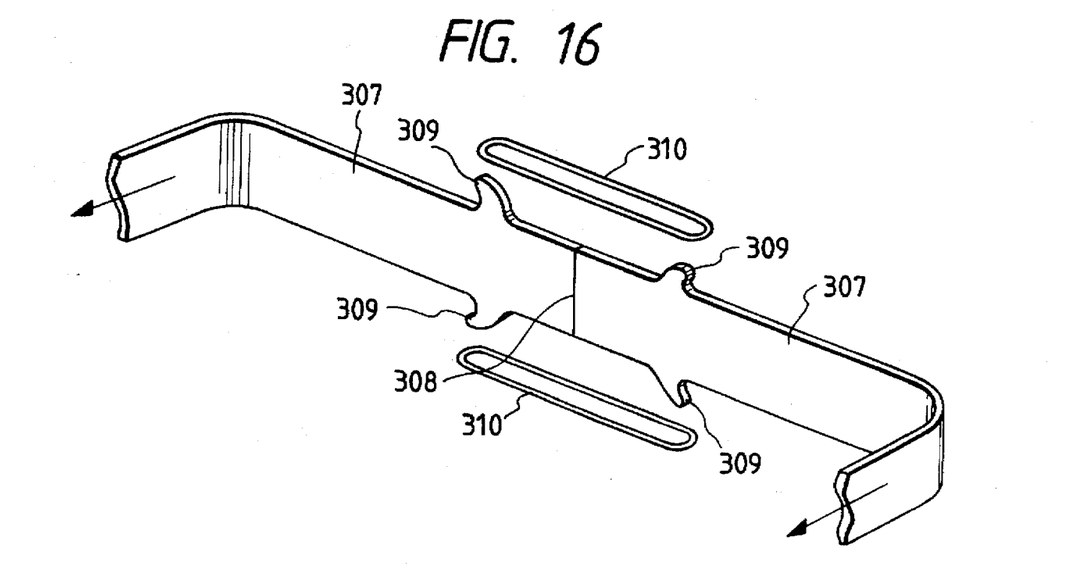
FIG. 16 a perspective view of a variation of the shield member of the portable IC card reader of FIG. 15.

Referring to FIG. 16, there is shown a variation to the third embodiment. In this variation, the springs 300 are replaced with another mechanism. Namely, the shield members 307 are formed with hooks 309 at abutting ends. Pairs of opposite hooks 309 are connected with rubber bands 310. Thus, when the IC card 200 is inserted from the IC card insert port 102 of the IC card reader 100, the shield members 307 are pulled to both sides to open the foreign-matter ejection exit 122, stretching the rubber bands 310. When the IC card 200 is removed, the shield members 307 are returned to the home positions by the force of the rubber bands 310 to close the foreign-matter ejection exit 122.

As described and according to the present invention, foreign matters that have penetrated an IC card accommodating unit of an IC card reader mainly during carrying of the IC card reader in a clothes pocket, a bag or the like, are ejected by the insertion of an IC card and, at the same time, the inside of the IC card reader is cleaned to ensure good contact between the inserted IC card and the IC card reader, thereby providing the easy-to-carry and reliable IC card reader.

While the preferred embodiments of the present invention have been described using specific terms, such description is for illustrative purposes only, and it is to be understood that changes and variations may be made without departing from the spirit or scope of the appended claims.

What is claimed is:

1. A portable integrated-circuit card reader for retrieving information from an integrated-circuit card incorporating a semiconductor memory device and for displaying at least part of said information, said portable integrated-circuit card reader being of a size suitable for transport in a personal carrier, comprising: a housing having a display portion, provided on a part of said housing, for displaying said at least part of said information; a controller; an integrated-circuit card insert port, on at least a part of a surface of said housing, for receiving said integrated-circuit card; an integrated-circuit card accommodating unit extending straight from said integrated-circuit card insert port to an opposite side of said housing; and a foreign-matter ejection exit formed by extending said integrated-circuit card accommodating unit, said foreign-matter ejection exit opening at an opposite side of said integrated-circuit card insert port.

2. A portable integrated-circuit card reader according to claim 1, wherein said foreign-matter ejection exit is provided with a lid member for covering said foreign-matter ejection exit, and said lid member being opened by insertion of said integrated-circuit card.

3. The portable integrated-circuit card reader recited in claim 1, wherein said personal carrier is one of the group consisting of a clothes pocket, a bag, and a briefcase.

4. The integrated-circuit card reader recited in claim 1, wherein said integrated-circuit card accommodating unit extends, without discontinuity, from said integrated-circuit card insert port to said foreign-matter ejection exit.

5. A portable integrated-circuit card reader for retrieving information from an integrated-circuit card incorporating a semiconductor memory device and for displaying at least part of said information, said portable integrated-circuit card reader being of a size suitable to fit in a personal carrier, comprising: a housing having a display portion for displaying said at least part of said information; and a controller, said housing further having, at least on a part of a surface thereof, an integrated-circuit card insert port for receiving said integrated-circuit card and an integrated-circuit card accommodating unit extending straight from said integrated-circuit card insert port to an opposite side of said housing, said housing further having a foreign-matter ejection member for ejecting foreign matter from said integrated-circuit card accommodating unit by insertion of said integrated-circuit card.

6. The portable integrated-circuit card reader recited in claim 5, wherein said personal carrier is one of the group consisting of a clothes pocket, a bag, and a briefcase.

7. A portable integrated-circuit card reader for retrieving information from an integrated-circuit card incorporating a semiconductor memory device and for displaying at least part of said information, said portable integrated-circuit card reader being portable in a clothes pocket, a bag, or the like, comprising: a housing having a display portion, provided on a part of said housing, or displaying said at least part of said information and incorporating a controller, said housing further having, at least on a part of a surface thereof, an integrated-circuit card insert port through which said integrated-circuit card is inserted and an integrated-circuit card accommodating unit extending straight from said integrated-circuit card insert port to an opposite side of said housing, said housing further having a foreign-matter ejection member for ejecting foreign matter from said integrated-circuit card accommodating unit by insertion of said integrated-circuit card, wherein said foreign-matter ejection member is at a position to close said integrated-circuit card insert port before said integrated-circuit card is inserted.

8. A portable integrated-circuit card reader for retrieving information from an integrated-circuit card incorporating a semiconductor memory device and for displaying at least part of said information, said portable integrated-circuit card reader being portable in a clothes pocket, a bag, or the like, comprising: a housing having a display portion, provided on a part of said housing, for displaying said at least part of said information and incorporating a controller, said housing further having, at least on a part of a surface thereof, an integrated-circuit card insert port through which said integrated-circuit card is inserted and an integrated-circuit card accommodating unit extending straight from said integrated-circuit card insert port to an opposite side of said housing, said housing further having a foreign-matter ejection member for ejecting foreign matter from said integrated-circuit card accommodating unit by insertion of said integrated-circuit card wherein said foreign-matter ejection member slidably moves in said integrated-circuit card accommodating unit by insertion of said integrated-circuit card from said integrated-circuit card insert port.

9. A portable integrated-circuit card reader according to claim 8, wherein a cleaning member for cleaning the inside of said integrated-circuit card accommodating unit is provided.

10. A portable integrated-circuit card reader according to claim 9, wherein said cleaning member is attached to a part of said foreign-matter ejection member.

11. A portable integrated-circuit card reader according to claim 10, wherein said integrated-circuit card accommodating unit is internally arranged with a plurality of contact terminals for retrieving information from said integrated-circuit card, and said cleaning member is arranged at a location here said cleaning member cleans said plurality of contact terminals.

12. A portable integrated-circuit card reader for retrieving information from an integrated-circuit card incorporating a semiconductor memory device and for displaying at least part of said information, said portable integrated-circuit card reader being portable in a clothes pocket, a bag or the like, comprising: a housing having a display portion provided on a part of said housing for displaying said at least part of said information and incorporating a controller, said housing further having, at least on a part of surface thereof, an integrated-circuit card insert port through which said integrated-circuit is inserted and an integrated-circuit card accommodating unit extending straight from said integrated-circuit card insert port to an opposite side of said housing, said housing further having a cleaning member for cleaning the inside of said integrated-circuit card accommodating unit by insertion of said integrated-circuit card.

13. A portable integrated-circuit card reader according to claim 12, wherein said cleaning member is formed of at least one of flexible materials including felt, cloth, paper, and bonded fabric.

14. A portable integrated-circuit card reader for displaying data stored in an integrated-circuit card, comprising: a space in which an integrated circuit card is loaded, said space having a first opening through which said integrated-circuit card is inserted and a second opening connected to said first opening, said space having a construction for accommodating said integrated-circuit card, wherein a width of said second opening is smaller than a width of said first opening.

15. A portable integrated-circuit card reader for displaying data stored in an integrated-circuit card, comprising: a space in which an integrated circuit card is loaded, said space having a first opening through which said integrated-circuit card is inserted and a second opening connected to said first opening, said space having a construction for accommodating said integrated-circuit card, wherein a blocking member for blocking the passage of said integrated-circuit card is arranged in the proximity of said second opening.

16. A portable integrated-circuit card reader for displaying data stored in an integrated-circuit card, comprising: a space for receiving an integrated-circuit card, said space having a first opening through which said integrated-circuit card is inserted and a second opening connected to said first opening, said space having a construction for accommodating said integrated-circuit card, said second opening leading to an exterior of said integrated-circuit card reader, wherein an opening direction of said first opening and an opening direction of said second opening are substantially disposed to be in an orthogonal relation.

17. The integrated-circuit card reader recited in claim 16, wherein said second opening expels dust from said space when said integrated-circuit card is advanced from said first opening to said second opening.

18. A portable integrated-circuit card reader for displaying data stored in an integrated-circuit card, comprising: a space for receiving said integrated-circuit card, said space having a first opening through which said integrated-circuit card is inserted and a second opening connected to said first opening, said first opening having a lid member slidable inside, said lid member being slidable inside by insertion of said integrated-circuit card to clean inside of said space, said lid member being moved up to a proximity of said second opening.

19. A portable integrated-circuit card reader according to claim 18, wherein at least a part of said lid member is formed with a cleaning member, said cleaning member cleaning a plurality of contact terminals in said housing which contact a plurality of contact terminals of said integrated-circuit card.

20. A portable integrated-circuit card reader according to claim 14, wherein said first opening is thicker and wider than said integrated-circuit card, and guide walls for guiding said integrated-circuit card are inserted to a predetermined position within said space.

* * * * *